United States Patent [19]

Nakajima

[11] Patent Number: 4,792,435

[45] Date of Patent: Dec. 20, 1988

[54] OXYGEN GENERATING SYSTEM

[75] Inventor: Masahiko Nakajima, Tokyo, Japan

[73] Assignee: Nakajima Dokosho Company Limited, Tokyo, Japan

[21] Appl. No.: 843,024

[22] Filed: Mar. 24, 1988

[30] Foreign Application Priority Data

Mar. 24, 1985 [JP] Japan .................................. 60-58931

[51] Int. Cl.[4] ....................... G05D 16/04; F28D 21/00
[52] U.S. Cl. .................................... 422/110; 422/122; 422/202
[58] Field of Search ............... 422/110, 122, 177, 202; 423/579

[56] References Cited

U.S. PATENT DOCUMENTS 3,887,696  6/1975  Bernard et al. ................... 204/129 X
3,917,461  11/1975 Kühl et al. ............................ 422/190
4,315,732  2/1982  Rowbottam et al. ............. 422/187 X
4,466,556  8/1984  Söchting ........................... 422/122 X
4,488,951  12/1984 Nolan et al. ........................ 204/84 X
4,601,884  7/1986  Coeckelsberghs et al. ......... 422/113

FOREIGN PATENT DOCUMENTS 42155  10/1977  Japan .
26445   7/1978  Japan .
49843  11/1981  Japan .
2056310  3/1981  United Kingdom ................ 422/122

Primary Examiner—Barry S. Richman
Assistant Examiner—J. Johnston
Attorney, Agent, or Firm—Cushman, Darby & Cushman

[57] ABSTRACT

An oxygen generating system for continuously generating oxygen gas by the catalytic decomposition of an aqueous hydrogen peroxide, includes a catalyst having a platinum group catalyst component carried on a highly porous sintered ceramic support of a large pore size and a reaction chamber for accommodating the catalyst. The system further includes a control device for controlling the operation of the hydrogen peroxide supplying based on a detection signal from a pressure sensor for detecting the pressure of the generated oxygen gas.

The oxygen generating system is compact and reduced in weight due to the catalytic decomposition of hydrogen peroxide at high concentration, which can be carried out effectively and safely under an increased temperature.

1 Claim, 3 Drawing Sheets

OXYGEN GENERATING SYSTEM

BACKGROUND OF THE INVENTION

1. Field of the Invention

This invention concerns an oxygen generating system and, more specifically, it relates to a portable oxygen generating system for continuously generating gaseous oxygen by the catalytic decomposition of aqueous hydrogen peroxide.

2. Description of the Prior Art

Oxygen gas has been utilized broadly for various applications such as medical, industrial and experimental uses, and most of oxygen generating apparatus in the prior art are voluminous and heavy due to the use of high pressure gas cylinders as the oxygen supply source. Although the handling of the oxygen gas cylinder is inconvenient and improvement has been demanded therefor, no suitable means have yet been developed.

By the way, as ceramics and various types of high melting alloys have been utilized in various fields along with the development of such new materials in recent years, compact heat processing means capable of simply melting or welding these materials at high temperature have been required.

As such heat processing apparatus, compact and weight-reduced combustion apparatus using liquefied gas as a heat catalyst source have already been put to practical use, such as a gas soldering iron, gas torch or hot blow developed by the present inventor. Accordingly, if any compact oxygen generating system is combined with such apparatus, melting or welding fabrication to dental materials, ornamental alloys, ceramics or the like can be applied with ease by the high temperature of so-called oxygen added combustion flames.

However, compact and lightweight oxygen generating systems that can supply oxygen gas for a long time are not yet known or used. As one of the means for reducing the size and the weight of the oxygen generating system, it will be effective to replace the high pressure oxygen gas cylinder as described above with a source of an aqueous hydrogen peroxide which is available readily, can be handled with ease and produce a great amount of oxygen per unit volume and decompose the same with the aid of a catalyst.

Japanese Utility Model Publication No. 26445/1980 discloses an oxygen gas generating system adapted to catalytically decompose aqueous hydrogen peroxide by using a manganese compound as a catalyst and utilize the thus obtained oxygen gas for life support systems in hospitals, etc.

However, since the decomposing reaction of the aqueous hydrogen peroxide with manganese dioxide or the like proceeds at an explosively high rate if the concentration of hydrogen peroxide exceeds about 5 w/w %, the concentration of aqueous hydrogen peroxide is usually limited to about 3 w/w %. However, if the volume (and weight) of a reservoir for aqueous hydrogen peroxide is intended to be decreased with the practical demand of reducing the entire size of the oxygen generating system so that the system can be portable, hydrogen peroxide at such a low concentration is rapidly consumed and the reservoir has to be replaced frequently, which is not practical at all.

While on the other hand, there has been known a platinum type catalyst capable of stably decomposing aqueous hydrogen peroxide at a high concentration (for example, from 30 to 60 w/w %) as disclosed in Japanese Patent Publication No. 42155/1977. However, the abovementioned catalyst has been found not satisfactory for use in actual oxygen generating system with the purpose as described above.

At first, for completely decomposing the aqueous hydrogen peroxide of a relatively limited flow rate and generating the oxygen gas efficiently for a long period of time, it is necessary that the reaction area of the catalyst per unit volume is increased as much as possible and also important that the catalyst is free from destruction and detachment from the support due to defoliation during use. However, no effective practical means are disclosed in this regard. For instance, if a support made of alumina or silica gel with a usual pore size about from 5 $\mu$m to 50 $\mu$m is used as in the conventional supported catalyst, the aqueous hydrogen peroxide as the reactant can not readily penetrate to the inside of the support.

In addition, since the gas pressure inside the pores is increased upon decomposing reaction, penetration of the reaction solution to the pores is further hindered. Further, most of the catalyst component is carried only near the surface of the support and, after all, the reaction is carried out only near the surface thereof. Further, the catalyst layer on the support tends to suffer from destruction and detachment with the increase of the gas pressure inside the support and to be washed out by the aqueous hydrogen peroxide. This limits the catalyst life extremely.

Furthermore, since the decomposition of aqueous hydrogen peroxide is an exothermic reaction as shown by the scheme:

$$H_2O_2 \rightarrow H_2O + \tfrac{1}{2}O_2$$

$$\Delta H 29.8 = -23.47 \text{ Kcalg}^{-1}\text{mol}^{-1}$$

it is desirable to maintain the reaction temperature as high as possible for promoting the decomposing reaction. Therefore, it is preferred to maintain the temperature of the catalyst to a predetermined temperature higher than the ambient temperature. However, the customary temperature control has been done in the direction of cooling rather than heating the reaction zone in order to avoid the uncontrollable and explosive decomposing reaction of aqueous hydrogen peroxide. Thus, temperature increase in the decomposing hydrogen peroxide reaction has been considered undesirable and not suggested at all in the prior art including the reference as described above.

Anyway, if it is intended to decompose aqueous hydrogen peroxide at an increased temperature, it would be indispensable for always controlling the flow rate of hydrogen peroxide to be supplied extremely strictly for the safe and stable decomposition thereof.

In the prior art, a system of controlling the flow rate of hydrogen peroxide by adjusting the opening degree of a valve for supplying aqueous hydrogen peroxide depending on the pressure of the generated oxygen gas by means of a link mechanism or the like has been proposed as disclosed, for example, in Japanese Patent Publication No. 49843/1981 (although the concentration of aqueous hydrogen peroxide is not high and the temperature is kept low in this case). However, in the proposed system of converting the gas pressure into mechanical displacement and transmitting the displacement by means of the link, it is difficult to rapidly respond to the change in the reaction rate and failures are liable to be caused due to the corrosion or abrasion in the actuation mechanism or the failure in the operation of the valve.

In summary, an oxygen generating system which is compact and of a reduced weight, as well as capable of supplying oxygen gas at a sufficient flow rate stably for a long period of time has to satisfy the requirements that aqueous hydrogen peroxide at a high concentration (at least greater than 5 w/w %) can be used as an oxygen generation source, the catalyst and that the catalyst support has a long service life, can completely and stably decompose the aqueous hydrogen peroxide and perform the decomposition of the aqueous hydrogen peroxide at a temperature as high as possible and under safety control.

However, oxygen generating systems capable of satisfying such requirements have not yet been known at all in the prior art including the literatures as cited above.

SUMMARY OF THE INVENTION

Accordingly, it is an object of this invention to provide an oxygen generating system reduced in the size and the weight and yet capable of continuously generating a required flow rate of an oxygen gas for a long period of time by the catalytic decomposition of aqueous hydrogen peroxide at a high concentration.

Another object of this invention is to provide an oxygen generating system capable of generating an oxygen gas stably and effectively through the decomposition of aqueous hydrogen peroxide at an increased reaction temperature without the danger of uncontrollable explosive reaction.

A further object of this invention is to provide an oxygen generating system capable of generating an oxygen gas always under a controlled flow rate.

CONSTITUTION OF THE INVENTION

The foregoing objects can be attained in accordance with this invention in an oxygen generating system for continuously generating oxygen gas by the catalytic decomposition of an aqueous hydrogen peroxide comprising:

means for supplying an aqueous hydrogen peroxide at a high concentration from a reservoir little by little by a predetermined constant flow rate under control, a catalyst having a platinum group catalyst component carried on a highly porous sintered ceramic support of a large pore size, a reaction chamber for accommodating the catalyst such that the decomposing reaction region for the aqueous hydrogen peroxide is maintained at a predetermined increased temperature, and a control device having a pressure sensor for detecting the pressure of the oxygen gas generated through the decomposition of the aqueous hydrogen peroxide by the catalyst and means for controlling the operation of the afore-mentioned means for supplying the aqueous hydrogen peroxide based on a detection signal from the pressure sensor.

In a preferred embodiment of this invention, means for supplying the aqueous hydrogen peroxide is constituted with a tube pump comprising a rotor rotating at a variable speed and a flexible tube disposed as a flowing channel for the aqueous hydrogen peroxide disposed along the rotating circumference of the rotor and squeezed to send the aqueous hydrogen peroxide sucked therein successively by the rotation of the rotor.

The support made of highly porous sintered ceramic support preferably has a pour size within a range from 100 $\mu$m to 500 $\mu$m.

The ceramic support is preferably composed of mullite type sintered ceramic particles.

The catalyst component preferably comprises a first catalyst layer made of platinum group metal closely bonded under sintering at high temperature to the particles of the ceramic support and a second catalyst layer made of platinum group metal with a high catalytic activity further deposited on the first catalyst layer.

The reaction chamber preferably has a heat insulating circumferential walls accommodating the catalyst while thermally insulated the same from the external atmosphere.

In accordance with this invention, since the aqueous hydrogen peroxide at a high concentration is used for the catalytic decomposition, the volume and thus the weight of a reservoir for supplying a required amount of hydrogen peroxide can remarkably be decreased thereby enabling to provide a portable oxygen generating system suitable to practical use with no requirement for frequent replacement of the exhausted reservoir.

Further, since a platinum group catalyst carried on the highly porous ceramic support is used in this invention, aqueous hydrogen peroxide at such a high concentration as can not be used in the conventional oxygen gas generating systems can be decomposed effectively and safely with no explosive danger.

Furthermore, since the ceramic support is composed of highly porous sintered particles with a large pore size, the catalytic reaction area per volume is increased to enable effective decomposing reaction of the aqueous hydrogen peroxide. In addition since no substantial pressure of the oxygen gas is resulted in the highly porous supports, the catalyst component can be prevented from destruction and detachment from the catalyst support to remarkably increase the catalyst life.

Furthermore, since the decomposing reaction for the aqueous hydrogen peroxide is carried out within a reaction chamber maintained at a predetermined increased temperature, the exothermic decomposing reaction of the aqueous hydrogen peroxide can effectively and completely be carried out. In this regard, since the aqueous hydrogen peroxide is always supplied by a predetermined constant flow rate from the supply means controlled by the detection signal from the pressure sensor for the oxygen gas generated in the reaction chamber, the feed rate and, thus, the decomposing reaction rate can be maintained at a constant rate, whereby explosive danger due to the excess reaction rate can be avoided even is the temperature of the reaction chamber is increased.

Further, since the platinum group catalyst is used in this invention, the aqueous hydrogen peroxide at a high concentration as described above can be decomposed completely and safely at a stable reaction rate.

Further, since the catalyst is carried on the highly porous ceramic support with a relatively large pore size (for example, from 100 to 500 $\mu$m), the aqueous hydrogen peroxide as a reactant can rapidly penetrate to the inside of the support and can effectively be decomposed being in effective contact with the catalyst layer at the surface and the pore walls of the support.

Particularly, in accordance with this invention, since the aqueous hydrogen peroxide at a high concentration is supplied exactly by a predetermined flow rate to the reaction chamber by the positive operation of the supply means such as the tube pump, a predetermined reaction rate can always be ensured accurately. Furthermore, the operation of the supply means is properly controlled by a control device that detects the pressure of oxygen gas generated from the reaction chamber, the aqueous hydrogen peroxide at a high concentration can always be decomposed rapidly and safely at a predetermined controllable reaction rate.

BRIEF DESCRIPTION OF THE ACCOMPANYING DRAWINGS

These and other objects, features and advantageous effects of this invention will be made apparent by the detailed description of the preferred embodiments according to this invention referring to the accompanying drawings, wherein FIG. 1 is an explanatory view showing the outline of a preferred embodiment according to this invention;

DESCRIPTION OF THE PREFERRED EMBODIMENTS

(Outline of the System)

Figure 1:
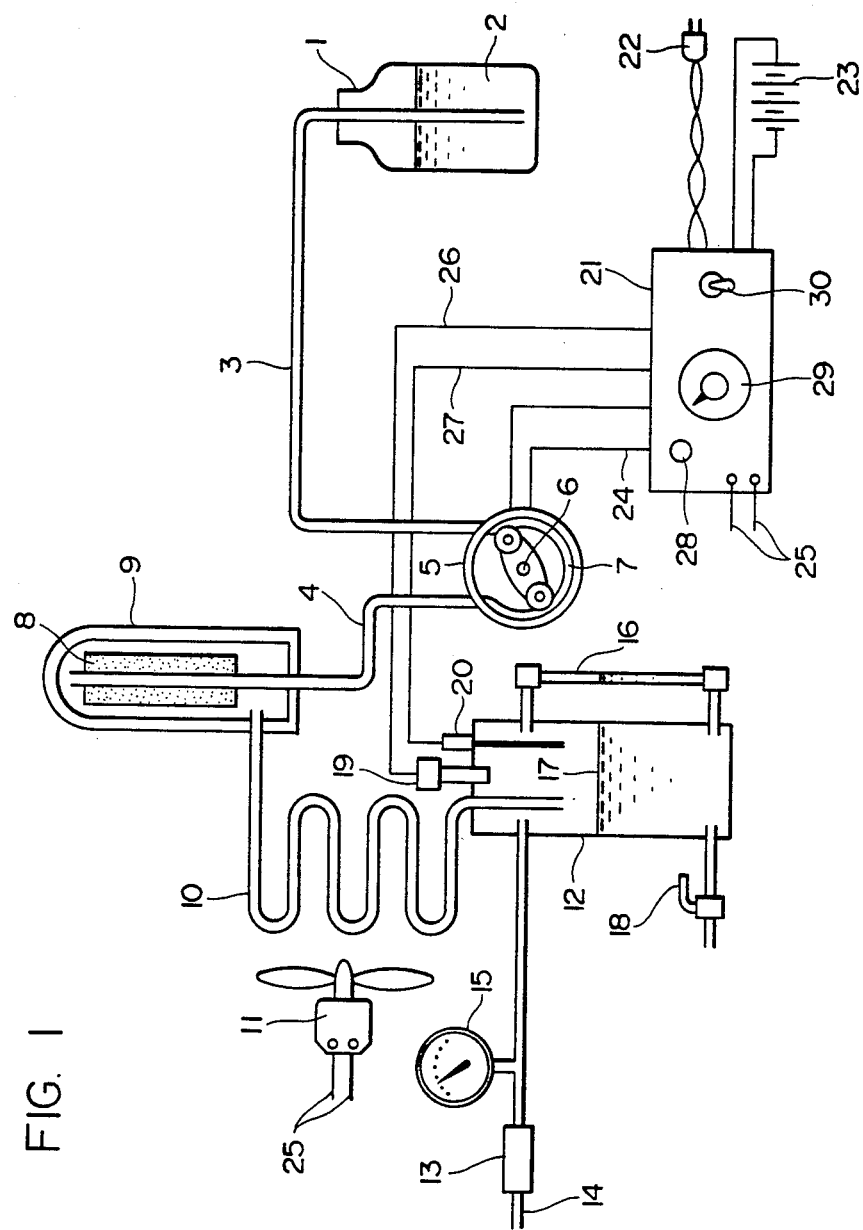

FIG. 1 is an explanatory view for the outline of the oxygen generating system according to this invention.

In the drawing, a reservoir 1 contains an aqueous hydrogen peroxide at a high concentration of about 30 w/w %, which is sucked by way of a sucking tube 3 and discharged to a pressure tube 4 at the downstream by way of a tube pump 5. The tube pump 5 is a constant volume supply pump well-known to the medical field or the like. It comprises a rotor 6 rotationally driven by a DC motor (not illustrated) and a flexible tube 7 disposed as a fluid channel along the rotating path of the rotor 6, in which the tube 7 is successively squeezed along with the rotation of the rotor 6 and the aqueous hydrogen peroxide in the reservoir 2 is sucked exactly by a controlled flow rate little by little in accordance with the rotating speed of the rotor 6 and discharged to the pressure tube 4.

The tubes 3, 7 are made of corrosion resistant silicone material and the pressure tube 4 is made of stainless steel or bronze which is also corrosion resistant.

A catalyst 8 as described later more specifically is accommodated within a heat insulating reaction chamber 9 such that the aqueous hydrogen peroxide supplied by a predetermined flow rate from the pressure tube 4 is caused to flow downward from the top of the catalyst 8 while penetrating therethrough.

A cooling chamber 10 is connected to an exit disposed at the lower portion of the reaction chamber and a blower 11 is disposed in the vicinity of the cooling tube 10 such that steams contained in the decomposing product of the aqueous hydrogen peroxide from the reaction chamber 9 passing through the tube are condensated by the cooling air from the blower 11. The distal end of the cooling tube 10 is connected to a gas/water separator 12 adapted for storing water formed by the condensation of the steams and for recovering the oxygen gas separated from the steams by way of an oxygen supply tube 14 having a spiral stabilizer 13 for stabilizing the pressure fluctuation in the oxygen gas. A pressure gage 15 is disposed to the oxygen supply tube 14 for monitoring the pressure of the oxygen gas. A transparent graduation tube 16 is attached to the gas/water separator 12 communicating the upper and the lower ends thereof with each other for monitoring the water level 17 in the separator. 18 denotes a draining cock.

A pressure sensor 19 for detecting the pressure of the oxygen gas and a water level sensor 20 for detecting the water level in the gas/water separator 12 are attached to the separator. These sensors may be any kind of wellknown semiconductor sensors or mechanical diaphragm sensors.

A control unit 21 has a power source for supplying electrical power from a receptable 22 for the commercial power source or from a portable electric battery 23 to the tube pump 5 and the blower 11 by way of lines 24, 25 respectively.

The control unit 21 further comprises an electrical control circuit (not illustrated) in a well-known constitution for varying or interrupting the voltage supplied to the DC motor of the tube pump 5 depending on the pressure signal detected by the pressure sensor 19 in the gas/mater separator 12 and then delivered by way of lead wire 26, an alarm lamp or buzzer 28 actuated by a signal for the water level detected by the water level sensor 20 and delivered by way of a lead wire 26 and a variable resistor 28 disposed for setting the voltage supply to the DC motor of the tube pump 5. 30 denotes a power source switch.

(Catalyst and Support)

The catalyst component usable in this invention can include those platinum group metals such as platinum, rhodium, palladium and iridium that can stably decompose the aqueous hydrogen peroxide at high concentration, for example, from 30 to 60 w/w % stably with a high decomposing activity. Furthermore, the ceramic support for carrying the catalyst component is preferably made of mullite type ceramics. Particularly, the pore size of the support composed of the ceramic particles is experimentally defined within a range from 100 to 500 μm in average.

If the pore size in the support is less than 100 μm as in the prior art, no effective decomposing reaction for the aqueous hydrogen peroxide can be carried out, since the penetration of the aqueous hydrogen peroxide to the inside of the support is insufficient, as well as the catalyst is liable to suffer from the destruction during use as described above. While on the other hand, if the pore size is larger than 500 μm, the support is fragile and no substantial effect of using the porous support can be obtained.

In embodiment, mullite type ceramic particles with the particle size of about 500 μm are molded into a hollow cylinder using stearate or gum arabic as a binder and sintered at a temperature of about 1300° C.

The sintered product was immersed in 3% aqueous solution of hydrogen fluoride for about 3 minutes under vacuum to activate the surface of the ceramic particles. As shown schematically in FIG. 2, highly porous ceramic body in which ceramic particles 31 are sintered with each other including pores 32 with a maximum pore size of about 500 μm can be obtained.

After washing sufficiently with distilled water and impregnated with 1% chloroplatinic acid solution rendered acidic by hydrochloric acid under vacuum, the sintered ceramic body is dried at room temperature for 24 hours.

Figure 2:
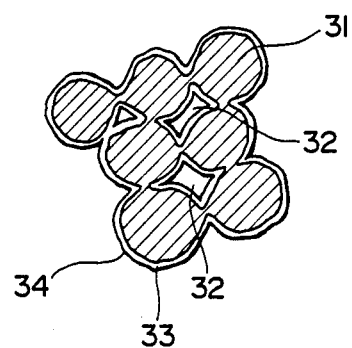
FIG. 2 is an explanatory view showing the outline of the cross section for the catalyst used in the above-mentioned embodiment.

After drying them further at 115° C. for three hours the sintered ceramics are subjected to reduction by heating at 200° C. for 30 minutes in a hydrogen gas stream and then sintered further at 800° C. for three hours to firmly secure the first platinum catalyst layer 33 closely to the surface of the ceramic particles 31 shown in FIG. 2.

After cooling, the ceramic body is again impregnated with 1% solution of chloroplatinic acid rendered acidic by hydrochloric acid, dried at room temperature for 24 hours and further at 115° C. for three hours and then heated in a hydrogen gas stream at 200° C. for about one hour to deposit a second platinum catalyst layer 34 with a high catalytic activity by a good metal-to-metal bond to the surface of the first platinum catalyst layer 33.

Figure 3:
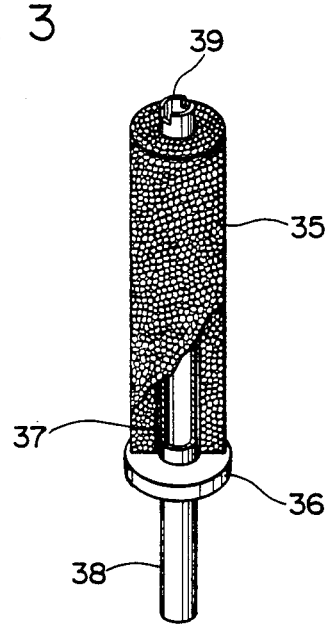
FIG. 3 is a partially cur-away perspective view of the catalyst.

As shown in FIG. 3, the hollow cylindrical catalyst 35 comprising the ceramic support and the platinum catalyst component is supported on a stopper 36. A pressure tube 38 (corresponding to the tube 4 in FIG. 4) for supplying an aqueous hydrogen peroxide is tightly inserted into the center aperture 37 and the opening at the top end of the tube is formed with a overflow recess 39 for overflowing the aqueous hydrogen peroxide from the upper end of the catalyst 35 and causing it to flow downward and penetrate through the pores 32.

(Heat Insulating Reaction Chamber)

Figure 4:
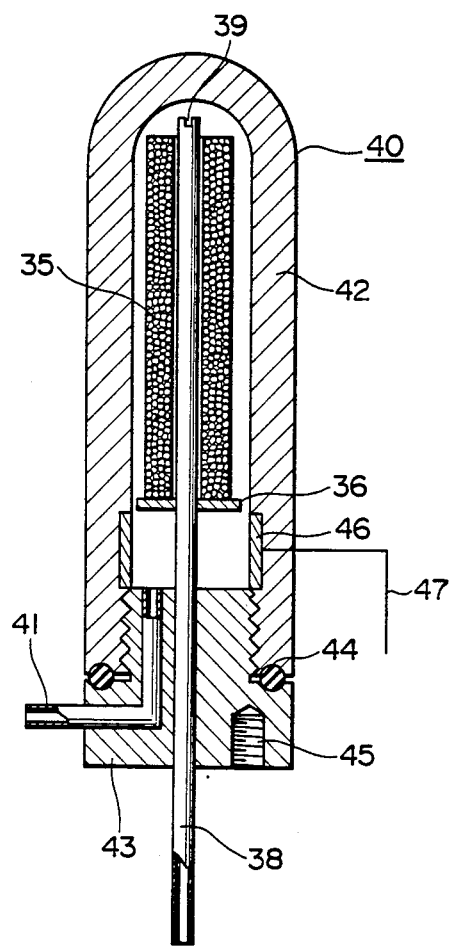
FIG. 4 is a vertical cross sectional view of a reaction chamber used in the above-mentioned embodiment and FIG. 5 is a vertical cross sectional view of a reaction chamber used in another embodiment of this invention.

The catalyst 35 is vertically disposed to the inside of a reaction chamber 40 as shown in FIG. 4 (corresponds to 9 in FIG. 1) such that the oxygen gas and steams generated by the decomposing reaction of the aqueous hydrogen peroxide are taken out from an exit 41 disposed at the bottom.

In this invention, it is preferred to maintain the temperature in the inside of the reaction chamber 40 to a predetermined increased temperature in order to promote the exothermic decomposing reaction of the aqueous hydrogen peroxide and complete the reaction for the entire portion thereof during passage through a relatively small volume of the catalyst.

In this embodiment, the heat generated from the reaction is kept as it is within the reaction chamber 40. That is, the circumferential wall 42 of the reaction chamber 40 accommodating the catalyst 35 is made of a polyfluoroethylene resin excellent in the heat insulating property and highly corrosion resistant to aqueous hydrogen peroxide. The bottom of the reaction chamber 40 is gas tightly secured to a retainer bottom plate 43 also made of a polyfluoroethylene resin by way of an O-ring 44. The reaction chamber 40 is secured to a system main body by way of a threaded hole 45.

In this specific embodiment where the inner space of the reaction chamber 40 is set to about 600 cc, an aqueous hydrogen peroxide flowing at a flow rate within a range from 5 ml to 800 ml/min can be decomposed completely without leaving unreacted $H_2O_2$ by defining the thickness of the heat insulating circumferential wall to about 5 mm.

Electrical heater coils 46 are embedded to the inner circumference at the lower portion of the circumferential wall 42 of the reaction chamber 40 so that the inside of the chamber may preferably be pre-heated at the start of the oxygen generating system in order to sooner attain the pre-determined reaction rate and shorten the warming-up time for the system.

(Operation of the System)

Upon starting the operation of the oxygen generation system in FIG. 1, the variable resistor 29 of the control unit 21 is previously set such that an oxygen gas can be obtained from the oxygen supply tube 14 at a desired flow rate, for example, of 200 ml/min, which is suitable to the preparation of an oxygen-added combustion frame in combination with a portable liquefied gas torch. When the power source switch 30 is turned on, the tube pump 5 is applied with a voltage set by the variable resistor 29 and rotated at a predetermined rotating speed to suck the aqueous hydrogen peroxide 2 at about 30 w/w % in the reservoir 1 and discharge the same to the pressure tube 4 (38) at a predetermined flow rate exactly in accordance with the rotating speed.

The aqueous hydrogen peroxide thus supplied from the pressure tube 4 is overflown from the recess 39 formed at the top end of the pressure tube 4 to the top of the cylindrical catalyst 35 (8) and then flows downward while in contact with the surface and the pore walls of the pores 32 in the porous catalyst 35 as shown in FIGS. 2 and 3, by which the decomposing reaction of the aqueous hydrogen peroxide is initiated with the highly active platinum catalyst component 34. In this case, the decomposing reaction is at first accelerated by the temperature inside the reaction chamber 40 preheated by the electrical heater coils 46. Then, the heat resulted from the reaction is accumulated within the reaction chamber 40 while being kept from diffusing externally by the effect of the heat insulating circumferential wall 42. Then, the temperature inside the reaction chamber 40 attains an equillibrium with the balance in a short period of time between the heat increasing effect of the exothermic reaction and the cooling effect by the aqueous hydrogen peroxide supplied. Then, the power supply for the pre-heater coils 46 are disconnected and, thereafter, the aqueous hydrogen peroxide is completely and stably decomposed into the oxygen gas and steams by the aid of the platinum catalyst 35 and by the reaction heat accumulated in the reaction chamber.

Then, the decomposing product composed of $O_2$ and $H_2O$ is issued from the exit 41 disposed at the bottom of the reaction chamber 40 and then sent to the cooling tube 10 (FIG. 1). During passage in the tube 10, $H_2O$ in the form of steams is cooled by the cooling air stream from the blower 11 and condensated into water and then sent together with the oxygen gas to the gas/water separator 12 disposed below.

In the gas/water separator 12, water is stored at the bottom, while the oxygen gas at high purity separated from the water is taken out through the oxygen supply tube 14 at a predetermined constant flow rate of 200 ml/min. The thus obtained oxygen gas is then added, for example, to a liquefied fuel butane gas obtained from a gas torch for forming a so-called oxygen-added frame combustion at high temperature. The constant gas flow rate from the supply tube 14 is further made stable during passage in the spiral stabilizer 13.

If the decomposing reaction rate of the hydrogen peroxide in the reaction chamber 40 changes greatly from the predetermined value by some and other reasons, this change reflects as the that in the pressure of the oxygen gas in the gas/water separator 12, which is detected by the pressure sensor 19 attached to the separator and the detection signal is sent by way of the lead 26 to the control unit 21. The electrical signal processing circuit (not illustrated) of the control unit 21 properly treats the detection signal to increase or decrease the voltage supplied to the DC motor of the tube pump 5 to control the pump rotating speed. Accordingly, the flow rate of the aqueous hydrogen peroxide supplied to the reaction chamber 40 (8) is increased or decreased toward the direction of compensating the change in the decomposing reaction rate.

As the decomposing reaction proceeds, the level 17 of the water accumulated in the gas/water separator 12 is increased. The level is observed through the transparent graduation tube 16 attached outside of the separator 12 and the water is discharged when it arrives a predetermined level by the operation of the draining cock 18. Further, increase in the water level 17 is detected also by the level sensor 20. If the level approaches an upper limit level which may undesirably cause the water to issue into the oxygen supply tube 14, the detection signal from the level sensor 20 is sent to the control unit 21 to flicker the alarm lamp 28 and issue an emergency stop signal for interrupting the operation of the tube pump 5.

In this embodiment, since the decomposing reaction for the aqueous hydrogen peroxide is carried out at an extremely stabilized manner with the effect of the platinum catalyst and the catalyst has a long working life, substantial change scarcely occurrs in the reaction rate during operation. Accordingly, it is only necessary for the actual operation of the system that the tube pump 5 is usually operated at a predetermined set speed and stopped rapidly by the output signal from the pressure sensor only when abnormal pressure increase is resulted in the oxygen gas.

As described above, since aqueous hydrogen peroxide at a concentration as high as about 30 w/w % can be used in this embodiment, if the system is used for supplying an oxygen gas at a flow rate e.g., of 200 ml/min continuously for about 40 hours (which is suitable to the combined use with a practical portable gas torch lamp), the weight of the reservoir for the aqueous hydrogen peroxide can only be of about 5–6 kg (about 5 liter volume) as compared with the conventional system using hydrogen peroxide at about 3 w/w % concentration. Since the weight of the reservoir is responsible to the substantial weight of the entire system, this apparently means a great contribution of this invention to the size and weight reduction in the portable oxygen generating system.

The use of the aqueous hydrogen peroxide at high concentration is enabled by the platinum group catalyst component supported on the highly porous ceramic support which can effectively and stably decomposing hydrogen peroxide with no explosive danger. Further, since the porous support composed of sintered ceramic particles has a pore size of about 100–500 μm, the catalytic reaction zone for the hydrogen peroxide is significantly increased to enable rapid and complete decomposition of hydrogen peroxide in a limited volume of the reaction chamber.

Furthermore, since the pore size of the catalyst support is thus extremely larger, no substantial pressure is resulted due to the oxygen gas evolved in the pores of the support upon reaction. This can facilitate the pentration of the aqueous hydrogen peroxide and, particularly, prevent the destruction of the catalyst component and detachment thereof from the support which would otherwise be caused by the gas pressure and can prolong the service life of the catalyst. For instance, the catalyst life is at least as long as about 1000 hours under the working conditions as described before which is at least 10 times as long as that of usual catalysts carried on the ceramic supports.

Furthermore, the dual catalyst layer structure in this embodiment can further accelerate the catalytic decomposition of the hydrogen peroxide and prolong the catalyst life, since the first catalyst layer closely bonded at the high temperature sintering to the ceramic particles can ensure the firm securing of the catalyst component to the support and the second platinum catalyst layer can be deposited by metal-to-metal bonding on the first catalyst layer at a relatively low temperature which gives no substantial thermal damage to the high catalytic activity.

Further, since the catalyst is accommodated within the heat insulating reaction chamber in this embodiment, the heat resulted from the decomposing reaction can be kept as it is in the chamber and a predetermined flow rate of aqueous hydrogen peroxide can completely be decomposed during passage through the catalyst of a relatively small size.

Although positive heating for the catalytic decomposing region for the hydrogen peroxide has been considered dangerous and thus avoided so far, the reaction rate can be kept safely at a predetermined level in this embodiment by the strict control of the flaw rate of the hydrogen peroxide supplied to the reaction chamber by the use of a tube pump that positively sucks the aqueous hydrogen peroxide from the reservoir and supplying the same to the chamber. The amount of the aqueous hydrogen peroxide from the tube pump can accurately be controlled by the voltage and, thus, the rotational number of the DC motor.

The control for the flow rate of the hydrogen peroxide supplied to the reaction chamber is of course desirable also in view of the constant flow rate control for the generated oxygen gas for performing heat processing work at a constant temperature.

Figure 5:
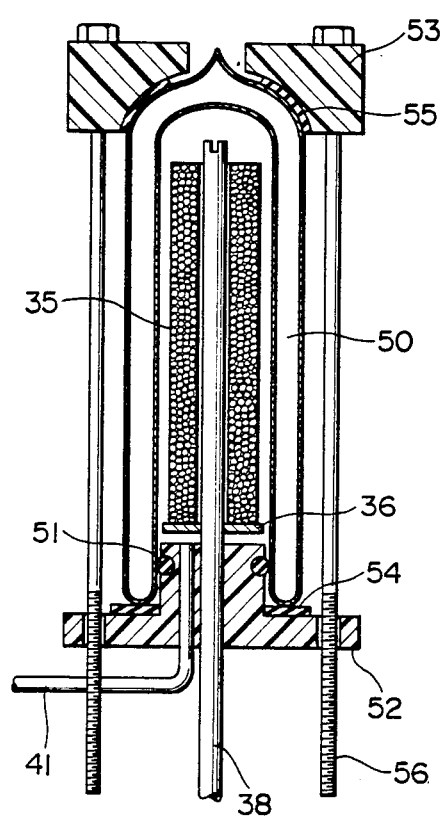

The reaction chamber which constitutes one of important features of this invention may be modified in various ways. For instance, in another embodiment shown in FIG. 5, the reaction chamber is formed with a so-called Dewar vessel 50 made of borosilicate glass. The Dewar vessel 50 accommodating the same catalyst 35 as in FIG. 4 is gas tightly sealed at the lower opening thereof to a retainer bottom 52 made of polyfluoroethylene by way of an O-ring 51 and the Dewar vessel 50 is secured by means of retainer bolt arms 56, 56 between the retainer bottom 52 and a hot flange 53 by means of rubber packings 54, 55. In the case of this embodiment using the Dewar vessel, the temperature in the reaction chamber can be kept at about 125° C. at the maximum for the flow rate of the aqueous hydrogen peroxide of about 5 ml–1000 ml/min.

Further, in this invention, any of platinum group metals may be used other than the platinum metal and ceramic particles of any particle size that can provide the pore size within the above specified range can be used. For instance, the catalyst prepared by using palladium chloride as the catalyst component and sintered mullite ceramics with the pore size of about 100 μm in the same manner as described above can attain the similar effect.

What is claimed is:

1. An oxygen generating system for continuously generating oxygen gas by the exothermic catalytic decomposition of an aqueous hydrogen peroxide comprising:

- a catalyst having a platinum group catalyst component carried on a highly porous sintered ceramic support of a large pore size;
- a reaction chamber including means for preheating said chamber and having a heat insulating circumferential wall having the catalyst held therewithin, said heat insulating circumferential wall thermally insulating a reaction region from an external atmosphere,
- means for supplying highly concentrated aqueous hydrogen peroxide from a reservoir to said reaction chamber at a restricted and controlled flow rate; and
- a control device having a pressure sensor for detecting the pressure of the oxygen gas generated through the exothermic decomposition of the aqueous hydrogen peroxide by said catalyst and means for controlling the operation of said means for supplying the aqueous hydrogen peroxide based on detection signal from said pressure sensor whereby said predetermined temperature is maintained.

* * * * *